United States Patent [19]

Küfner

[11] 3,988,047

[45] Oct. 26, 1976

[54] BEARING ASSEMBLY FOR A ROLL

[75] Inventor: Walter Küfner, Schweinfurt, Germany

[73] Assignee: SKF Industrial Trading and Development Company, B.V., Jutphaas, Netherlands

[22] Filed: Oct. 29, 1975

[21] Appl. No.: 626,648

[30] Foreign Application Priority Data

Dec. 14, 1974 Germany.................... 7441723[U]

[52] U.S. Cl.............................. 308/15; 308/207 R
[51] Int. Cl.$^2$........................................ F16C 13/00
[58] Field of Search.......... 308/15, 22, 36.1, 207 R, 308/207 A, 213, 236

[56] References Cited
UNITED STATES PATENTS 3,851,934  12/1974  Kufner................................ 308/15

*Primary Examiner*—M. H. Wood, Jr.
*Assistant Examiner*—Gene A. Church
*Attorney, Agent, or Firm*—Daniel M. Rosen

[57] ABSTRACT

In a bearing assembly for a roll the journal of the roll is supported radially by roller bearings mounted in a stationary support structure. The thrust bearing for the assembly includes a pair of outer rings mounted co-axially at the end of the journal, and a central ring therebetween and supported by the support structure. The rings define a pair of races for tapered roller bearings. The surfaces of the central disk extend normal to the axis of the journal. A support for the central ring includes a bolt co-axial with the journal and extending into a recess at the end of the journal. Apertures are provided in the structure to permit the flow of cooling air at the end of the assembly.

12 Claims, 1 Drawing Figure

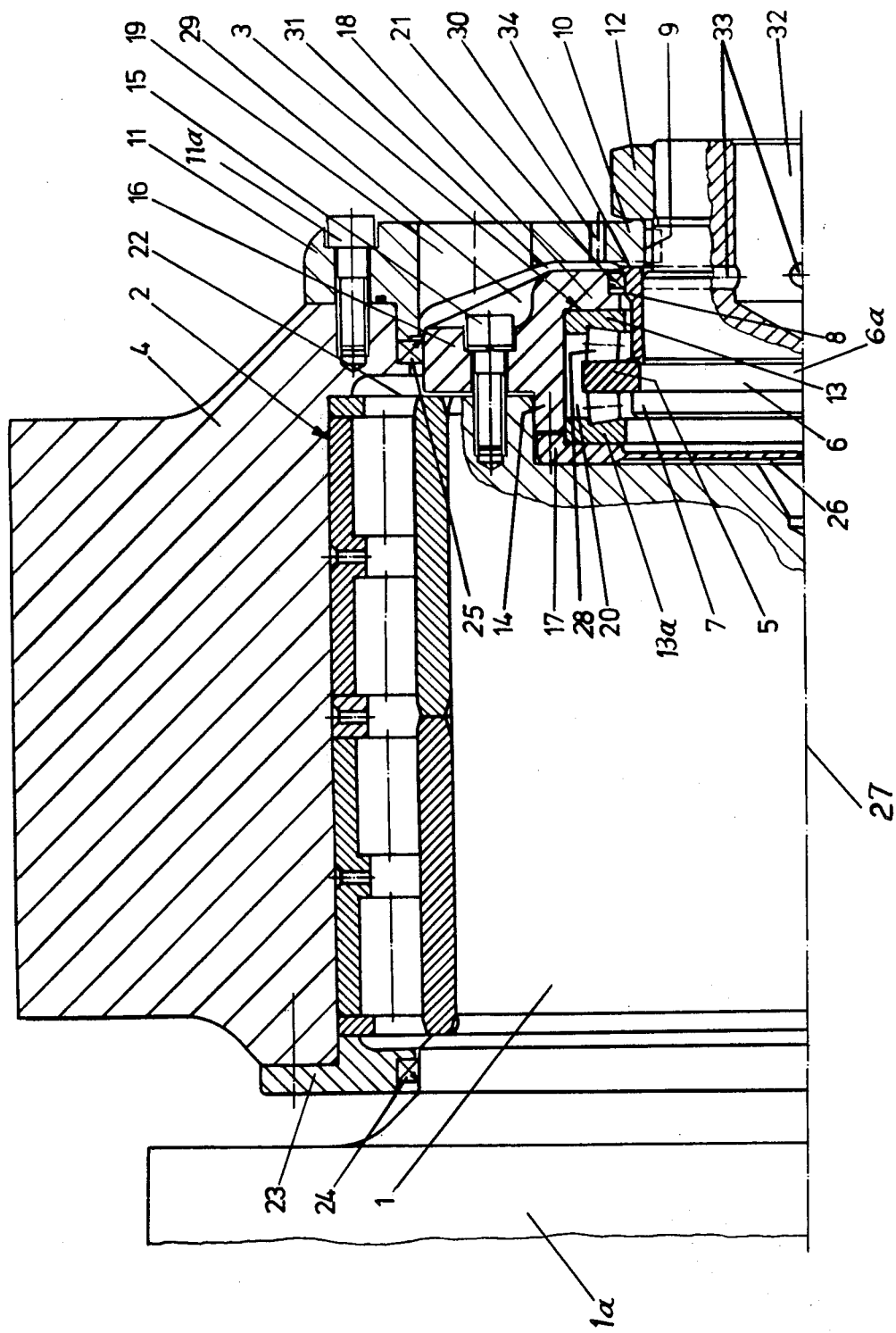

BEARING ASSEMBLY FOR A ROLL

THE INVENTION

This invention relates to bearing assemblies, and is more particularly directed to a bearing assembly of the type wherein the journal of a roll is radially supported by roller bearings held in a support member, and by thrust bearings at the end of the journal. While the invention is particularly directed to such a structure for mounting back-up rolls of rolling mills, it will be apparent that the invention may advantageously be applied in other applications.

In a conventional mounting for high speed axially and radially loaded rolls, for example, in a rolling mill, a journal of the roll is radially supported by roller bearings mounted in the support structure. The thrust bearing for such structures comprises a tapered roller bearing assembly mounted at the end of the journal. In conventional arrangements, the tapered roller bearing includes a pair of outer housing rings affixed to the stationary support member, and a central shaft ring, between the outer rings, and affixed to the journal of the roll. These rings define a pair of races for rings of tapered roller bearings.

In the above described arrangement, the tapered rollers of the thrust bearing assembly are driven by the central shaft ring. As a result, frictional heat is developed on each side of the shaft ring. When a roll is operated with high starting speeds and alternating directions of rotation, the shaft ring is thereby subjected to high thermal loads, with the result that dangers of overheating of the shaft ring occurs. In addition, a bearing assembly of the above type generally requires a large volume in the axial direction of the journal, since the tapered roller bearing assembly is mounted externally at the end of the radial roller bearing, and is mounted on an outward directed projection from the journal of the roll. As a consequence, the roll must be excessively long, and must be correspondingly expensive, in order to enable the use of such a bearing assembly.

The invention is therefore directed to the provision of a bearing assembly capable of operation at high rotational speeds with axial and radial loads, without the generation of local overheating due to friction in the axial bearing. In addition, the invention is directed to the provision of such a roller bearing assembly wherein the volume required for the assembly is a minimum, and wherein the assembly is inexpensive to manufacture and easy to assemble.

Briefly stated, in accordance with the invention, the bearing assembly is comprised of a radial support bearing for the journal of a roll, the radial support bearing being mounted in the stationary support structure. The thrust bearing or axial support bearing is comprised of a pair of outer housing rings mounted co-axially at the end of the journal, and a central shaft ring between the outer rings and affixed to an element that is rigidly connected to the structural support member. The housing rings and central shaft ring define a pair of races for tapered roller bearings. The element for supporting the central shaft ring preferably comprises a cylindrical bolt extending axially into the bearing rings. The central shaft ring may be affixed to the cylindrical bolt by any conventional means. The end of the cylindrical bolt away from the journal may be affixed, for example, in an aperture of a flange cover firmly connected to the structural support member. The outer housing rings of the roller bearing structure are preferably mounted in the boring of the hub of a cover rigidly affixed to the end face of the journal of the roll. The cover may be affixed to the journal, for example, by means of screws at the periphery of the cover. In this arrangement, the tapered roller bearing assembly can be easily assembled or disassembled as a structural unit, together with the cover affixed to the face of the journal.

In order to reduce the length of the journal, the journal may have a concentric recess, the hub part of the cover extending at least partly into this recess. As a result, a portion of the thrust bearing assembly is within the end of the journal.

The faces of the central shaft ring are preferably normal to the axis of the journal. This feature enables small radial displacement or eccentricities of the cylinder bolt with respect to the cover affixed to the journal of the roll of the bearing assembly, without damage due to jamming in the structure.

The bearing assembly, in accordance with the invention, may be easily sealed by the provision of packing elements between the cover on the end of the journal, and an axial bore in the structural support member.

In accordance with the further feature of the invention, radially directed ribs are provided on the cover at the side thereof away from the journal. This increases the mechanical stability of the cover, and also provides a ventilating effect during the rotation of the journal, so that cooling air in the intermediate space between the flange of the structural member and the cover affixed to the journal is moved radially outwardly. This arrangement thereby enables heat generated by the tapered roller bearing assembly and conveyed to the cover to be dissipated. In addition, axial apertures may be provided suitably distributed at the periphery of the flange cover for enabling flow of cooling air through the intermediate space, the apertures being placed at the radial internal portion of the flange cover to serve as inflow apertures, and at the radially external portion of the flange to serve as outflow apertures.

In accordance with a further feature of the invention, one or more apertures may be provided at the end of the cylindrical bolt away from the journal, these apertures also communicating with the intermediate space and serving as a further path for cooling air in the structure. It is, of course, apparent that the radially extending ribs on the cover of the journal are preferably designed to draw air radially outwardly through the intermediate space from the inward apertures of the flange cover and the apertures in the cylindrical bolt.

In order that the invention will be more clearly understood, it will now be described in greater detail with reference to the accompanying singular drawing, which is a partial longitudinal cross-section through a bearing assembly in accordance with the invention. The drawing illustrates the bearing assembly only at one side of the axis thereof, and it will, of course, be understood that the assembly is similarly constructed at the other side of the axis.

Referring now to the drawing, the bearing assembly in accordance with the invention comprises a journal 1 on the end of a roll 1a. The roll 1a may, for example, be a back-up roll of a rolling mill. The journal 1 of the roll is radially supported in a multiple roll cylindrical roller bearing 2 held in the bore of the structural member, such as a stationary support 4. The journal 1 is axially supported by a double roll axially tapered roller bearing denoted generally by the numeral 3. The axial roller bearing 3 is disposed at the end of the journal.

A flange cover 11 is affixed to the support member 4 at the end of the journal, to generally cover the bore in the support member. For this purpose, suitable bolts 11a may be provided at the periphery of the flange. The flange cover 11 has a central hub 10 surrounding an axial bore therein, and a cylindrical bolt 6 extends through the bore of the hub and into the space between the flange cover and the end of the journal, as well as axially through the bearing 3. The cylindrical bolt may be housed in the flange cover by suitable means, such as a nut 12 threaded on the end of the bolt 6.

The central shaft ring 5 of the roller bearing 3 extends radially inwardly to a cylindrical surface 6a of the cylindrical bolt 6, and is axially held on the bolt 6 by a collar 7 on the side of the bolt toward the end of the bearing, and by a collar 8 extending from the central ring 5 to the inner side of the hub 10, so that tightening of the nut 12 firmly clamps the shaft ring 5 between the collars 7 and 8. The cylindrical bolt 6 is held against rotation with respect to the hub 10 by means of a key 9 extending in suitable slots in the hub 10 and bolt 6. The journal 1 has a concentric recess 26 at its end. The hub 14 of a cap or cover 16 extends into the recess 26. The cover 16 may be affixed to the end face of the journal by bolts 13 fixed at the periphery of the cover. With this arrangement, a portion of the bearing assembly 3 may be provided within the recess 26, whereby the axial length of the journal may be minimized, and the cost of the roll reduced.

The bearing assembly 3 further includes an inner housing ring 13a toward the end of the journal, and an outer housing ring 13 away from the end of the journal 1, these rings being disposed in a central bore of the hub 14 of the cover 16. The rings 13a and 13 are axially spaced apart, and the central ring 5 extends therebetween, to define a pair of annular races for tapered roller bearings 28. In the arrangement of the invention illustrated in the drawing, the outer ring 13 abuts a shoulder 18 in the hub 14, and an inner cover 17 is provided on the inner face of the hub 14, within the recess 26. The cover 17 may be affixed to the hub 14 by any conventional means, such as bolts (not shown), for holding the bearing rings 13 and 13a in the bore of the hub 14.

The assembly in accordance with the invention may be easily provided with suitable seals. Thus, the bearing space 20 of the bearing assembly 3 may be sealed by means of a sealing ring 21 extending between the collar 8 and the radially inwardly extending shoulder of the cover 16. This ring 21 is adapted to slide on the boring surface of the cover 16. The ring 21 prevents undesirable dirt from entering the bearing space 20 when assembling or disassembling the roller bearing assembly 3 as to structural unit.

The bearing frame 22 of the roller bearing assembly 2 is sealed on the side toward the roll 1a by a sealing ring 24 inserted in the end cover 23 of the assembly 2 and sliding on the journal 1. In addition, a sealing ring 25 is inserted in the boring of the support member 4 on the side thereof away from the roll 1a, the sealing ring 25 sliding on the surface of the outside diameter of the cover 16.

The central shaft ring 5 of the tapered roller bearing assembly has plane surfaces on the sides thereof toward and away from the end of the journal, and these plane surfaces extend in planes normal to the axis 27 of the journal. This permits the cylindrical bolt 6, together with the shaft ring 5 fastened thereto, to move radially with respect to the journal 1 of the roll, without causing dangerous jamming in the tapered roller bearing assembly. Displacements of this kind may originate, for example, as a result of radial eccentricities or variations of play in the cylinder roller bearing assembly 2 in operation.

The outer face of the cover 16, away from the journal, is provided with radially extending ribs 29 evenly distributed at its periphery. These ribs stiffen the cover 16, and at the same time function as a blower during the rotation of the roll, so that cooling air is directed to flow radially outwardly between the flange cover 11 and the cover 16. For this purpose, radially outer apertures 19 and radially inner apertures 30 are provided in the flange cover 11, whereby cooling air drawn radially by the ribs 29 passes into the intermediate space 31 between the flange cover 11 and cover 16 by way of the apertures 30, and this air is exhausted by way of the apertures 19. The apertures 19 and 30 may be evenly distributed about the periphery of the flange cover 11.

The cylindrical bolt 6 has a concentric aperture 32 at its external end, and a plurality of radially extending apertures 33 are provided extending through the bolt 6 from the aperture 32 toward the intermediate space 31. Radially extending grooves 34 are provided on the face of the hub 10 of the flange cover 11, so that cooling atmospheric air may flow through the aperture 32, thence radially outwardly to the apertures 33 and the grooves 34 into the intermediate space 31. The arrangement in accordance with the invention thereby enables the removal of heat from the bearing assembly 3 due to friction during the rotation of the roll.

While the invention has been disclosed and described with reference to a single embodiment, it will be apparent that modifications and variations may be made therein, and it is intended in the following claims to cover all such variations and modifications as follows in the true spirit and scope of the invention.

What is claimed is:

1. In a bearing assembly for a roll including a supporting member, roller bearing means mounted in said support member for radially supporting the journal of said roll, and bearing means mounted on said support member for axially supporting said journal comprising first and second outer housing rings and a central shaft ring therebetween and co-axial with said journal, said rings defining first and second races, and tapered roller bearings assembled in said races, the improvement wherein said first and second outer housing rings are affixed to said journal of said roll, and further comprising means mounted on said support member for supporting said central shaft ring.

2. The bearing assembly of claim 1 wherein said means mounted on said support member for supporting said central shaft ring comprises a cylindrical bolt axially extending into said bearing means for axially supporting said journal.

3. The bearing assembly of claim 2 further comprising a flange cover affixed to said support member adjacent the end of said journal, said flange cover having a central aperture, said cylindrical bolt extending into said aperture and being held therein.

4. The bearing assembly of claim 1 further comprising a cover member affixed to the end of said journal, said cover member having a hub, and a bore in said hub, said first and second outer housing rings being assembled in said bore of said hub.

5. The bearing assembly of claim 4 wherein the end face of said journal has a concentric recess, said hub of said cover extending at least partly into concentric recess.

6. The bearing assembly of claim 1 wherein said central shaft ring has inner and outer plane surfaces extending in planes normal to the rotational axis of said journal, whereby said tapered roller bearings roll on said plane surfaces.

7. The bearing assembly of claim 4 wherein said support member has a bore concentric with said journal, further comprising sealing means between the outer periphery of said cover and said bore of said support member.

8. The bearing assembly of claim 4 further comprising sealing means between the end of said hub away from said journal and said means mounted on said support member for supporting said central shaft ring, said means for supporting said central shaft ring comprising a cylindrical bolt extending co-axially through said bearing means for axially supporting said journal.

9. The bearing assembly of claim 4 further comprising radially extending ribs on the face of said cover away from said journal.

10. The bearing assembly of claim 9 further comprising a flange cover on said support member adjacent said face of said first mentioned cover, said flange cover having a first plurality of radially outer apertures and second plurality of radially inner apertures extending therethrough, whereby air may be directed by said ribs to flow through said apertures and in the intermediate space between said flange and said first mentioned cover.

11. The bearing assembly of claim 10 wherein said means for supporting said central shaft ring comprises a cylindrical bolt affixed to said flange cover and extending co-axially into said bearing means for axially supporting said journal, said cylindrical bolt having an axially extending aperture, and radially extending apertures communicating with said axially extending aperture, said radially extending apertures communicating with said intermediate space.

12. The bearing assembly of claim 11 wherein said flange cover has a hub through which said cylindrical bolt extends, the face of the hub of said flange cover toward said journal having radially extending grooves communicating between said intermediate space and said radially extending apertures of said cylindrical bolt.

* * * * *